United States Patent Office 3,849,487
Patented Nov. 19, 1974

3,849,487
NATURAL 15-METHYL AND ETHYL-15-EPI-PGE₁
Gordon L. Bundy, Portage, Mich., assignor to The
Upjohn Company, Kalamazoo, Mich.
No Drawing. Continuation-in-part of abandoned application Ser. No. 37,307, May 14, 1970. This application July 24, 1972, Ser. No. 274,643
Int. Cl. C07c 61/36, 69/74
U.S. Cl. 260—514 D                2 Claims

ABSTRACT OF THE DISCLOSURE

Prostaglandin E₁-type compounds with a methyl or an ethyl substituent at the C–15 position and with the C–15 hydroxy in R configuration are disclosed. These are useful for the same pharmacological purposes as the unsubstituted prostaglandins.

CROSS REFERENCE TO RELATED APPLICATIONS

This application is a continuation-in-part of my copending application Ser. No. 37,307, filed May 14, 1970 now abandoned.

DESCRIPTION OF THE INVENTION

This invention relates to novel compositions of matter, to novel methods for producing those, and to novel chemical intermediates useful in those processes. In particular, this invention relates to novel derivatives of prostanoic acid which has the following structure and atom numbering:

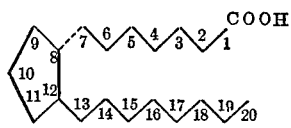

Various derivatives of prostanoic acid are known in the art. These are called prostaglandins. See, for example, Bergstrom et al., Pharmacol. Rev. 20, 1 (1968), and references cited therein. For example, prostaglandin E₁ (PGE₁) has the following structure:

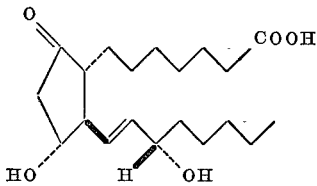

Prostaglandin F₁ₐ (PGF₁ₐ) has the following structure:

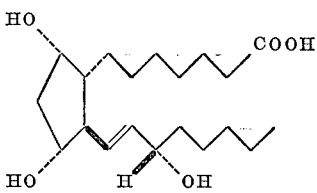

Prostaglandin F₁β (PGF₁β) has the following structure:

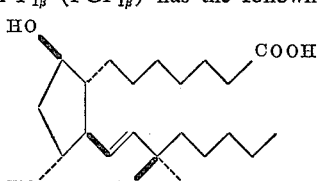

In formulas II to IV, broken line attachments to the cyclopentane ring indicate substituents in alpha configuration, i.e., below the plane of the cyclopentane ring. Heavy solid line attachments to the cyclopentane ring indicate substituents in beta configuration, i.e., above the plane of the cyclopentane ring. The side-chain hydroxy at C–15 in formulas II to IV is in S configuration. See Nature, 212, 38 (1966) for discussion of the stereochemistry of the prostaglandins.

Molecules of the known prostaglandins each have several centers of asymmetry, and can exist in racemic (optically inactive) form and in either of the two enantiomeric (optically active) forms, i.e., the dextrorotatory and levorotatory forms. As drawn, formulas II to IV each represent the particular optically active form of the prostaglandin which is obtained from certain mammalian tissues, for example, sheep vesicular glands, swine lung, or human seminal plasma, or by carbonyl and/or double bond reduction of a prostaglandin so obtained. See, for example, Bergstrom et al., cited above. The mirror image of each of formulas II to IV would represent the other enantiomer of that prostaglandin. The racemic form of a prostaglandin would contain equal numbers of both enantiomeric molecules, and one of formulas II to IV and the mirror image of that formula would both be needed to represent correctly the corresponding racemic prostaglandin. For convenience hereinafter, use of the terms PGE₁, PGF₁ₐ, and PGF₁β will mean the optically active form of that prostaglandin with the same absolute configuration as PGE₁ obtained from mammalian tissues. When reference to the racemic form of one of those prostaglandins is intended, the word "racemic" will precede the prostaglandin name, thus, racemic PGE₁ or racemic PGF₁ₐ.

Each of the novel prostanoic acid derivatives of this invention is encompassed by the following formula or by the combination of that formula and its mirror image:

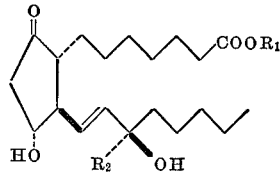

In formula V, R₁ is hydrogen, alkyl of one to 8 carbon atoms, inclusive, or a pharmacologically acceptable cation, and R₂ is methyl or ethyl.

In formula V, the configuration of the hydroxy at C–15 is R as in the known prostaglandins of formulas II to IV.

A significant characteristic of all of the known prostaglandins is the secondary S hydroxy group at C–15, i.e., the atom grouping

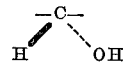

Prostaglandins obtained from animal tissues always contain that atom grouping. In striking contrast, each of the novel prostanoic acid derivatives of this invention has a tertiary R hydroxy group at C–15, i.e., the atom grouping

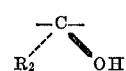

wherein R₂ is methyl or ethyl. Thus, these novel prostanoic acid derivatives may conveniently be designated 15 - methyl - 15(R)-prostaglandins or 15-ethyl-15(R)-prostaglandins, e.g., 15-methyl-15(R)-PGE₁ and 15-ethyl-15(R)-PGF₁ₐ.

As in the case of formulas II to IV, formula V is intended to represent optically active prostanoic acid derivatives with the same absolute configuration as PGE₁ obtained from mammalian tissues. The novel prostanoic acid derivatives of this invention also include the corresponding racemic compounds. Formula V plus its mirror image are necessary in combination to describe a racemic compound. For convenience hereinafter, when the word "racemic" precedes the name of one of the novel prostanoic acid derivatives of this invention, the intent is to designate a racemic compound represented by the combination of the appropriate formula V and the mirror image of that formula. When the word "racemic" does not precede the compound name, the intent is to designate an optically active compound represented only by the appropriate formula V and with the same absolute configuration as $PGE_1$ obtained from animal tissues.

$PGE_1$ and its esters and pharmacologically acceptable salts are extremely potent in causing various biological responses. For that reason, these compounds are useful for pharmacological purposes. See, for example, Bergstrom et al., Pharmacol. Rev. 20, 1 (1968), and references cited therein. A few of those biological response are systemic arterial blood pressure lowering as measured, for example, in anesthetized (pentobarbitol sodium) pentolinium-treated rats with indwelling aortic and right heart cannulas; stimulation of smooth muscle as shown, for example, by tests on strips of guinea pig ileum, rabbit duodenum, or berbil colon; potentiation of other smooth muscle stimulants; antilipolytic activity as shown by antagonism of epinephrine-induced mobilization of free fatty acids or inhibition of the spontaneous release of glycerol from isolated rat fat pads; inhibition of gastric secretion as shown in dogs with secretion stimulated by food or histamine infusion; activity on the central nervous system; decrease of blood platelet adhesiveness as shown by platelet-to-glass adhesiveness, and inhibition of blood platelet aggregation and thrombus formation induced by various physical stimuli, e.g., arterial injury, and various biochemical stimuli, e.g., ADP, ATP, serontonin, thrombin, and collagen; and stimulation of epidermal proliferation and keratinization as shown when applied in culture to embryonic chick and rat skin segments.

Because of these biological responses, these known prostaglandins are useful to study, prevent, control, or alleviate a wide variety of diseases and undesirable physiological conditions in birds and mammals, including humans, useful domestic animals, pets, and zoological specimens, and in laboratory animals, for example, mice, rats, rabbits, and monkeys.

For example, these compounds are useful in mammals, including man, as nasal decongestants. For this purpose, the compounds are used in a dose range of about 10 $\mu$g. to about 10 mg. per ml. of a pharmacologically suitable liquid vehicle or as an aerosol spray, both for topical application.

PGE compounds are useful in mammals, including man and certain useful animals, e.g., dogs and pigs, to reduce and control excessive gastric secretion, thereby reducing or avoiding gastrointestinal ulcer formation, and accelerating the healing of such ulcers already present in the gastrointestinal tract. For this purpose, the compounds are injected or infused intravenously, subcutaneously, or intramuscularly in an infusion dose range about 0.1 $\mu$g. to about 500 $\mu$g. per kg. of body weight per minute, or in a total daily dose by injection or infusion in the range about 0.1 to about 20 mg. per kg. of body weight per day, the exact dose depending on the age, weight, and condition of the patient or animal, and on the frequency and route of administration.

PGE compounds are useful whenever it is desired to inhibit platelet aggregation, to reduce the adhesive character of platelets, and to remove or prevent the formation of thrombi in mammals, including man, rabbits, and rats. For example, these compounds are useful in the treatment and prevention of myocardial infarcts, to treat and prevent post-operative thrombosis, to promote patency of vascular grafts following surgery, and to treat conditions such as atherosclerosis, arteriosclerosis, blood clotting defects due to lipemia, and other clinical conditions in which the underlying etiology is associated with lipid imbalance or hyperlipidemia. For these purposes, these compounds are administered systemically, e.g., intravenously, subcutaneously, intramuscularly, and in the form of sterile implants for prolonged action. For rapid response especially in emergency situations, the intravenous route of administration is preferred. Doses in the range about 0.005 to about 20 mg. per kg. of body weight per day are used, the exact dose depending on the age, weight, and condition of the patient or animal, and on the frequency and route of administration.

PGE compounds are especially useful as additives to blood, blood products, blood substitutes, and other fluids which are used in artificial extracorporeal circulation and perfusion of isolated body portions, e.g., limbs and organs, whether attached to the original body, detached and being preserved or prepared for transplant, or attached to a new body. During these circulations and perfusions, aggregated platelets tend to block the blood vessels and portions of the circulation apparatus. This blocking is avoided by the presence of these compounds. For this purpose, the compound is added gradually or in single or multiple portions to the circulating blood, to the blood of the donor animal, to the perfused body portion, attached or detached, to the recipient, or to two or all of those at a total steady state dose of about .001 to 10 mg. per liter of circulating fluid. It is especially useful to use these compounds in laboratory animals, e.g., cats, dogs, rabbits, monkeys, and rats, for these purposes in order to develop new methods and techniques for organ and limb transplants.

PGE compounds are extremely potent in causing stimulation of smooth muscle, and are also highly active in potentiating other known smooth muscle stimulators, for example, oxytocin agents, e.g., oxytocin, and the various ergot alkaloids including derivatives and analogs thereof. Therefore $PGE_1$, for example, is useful in place of or in combination with less than usual amounts of these known smooth muscle stimulators, for example, to relieve the symptoms of paralytic ileus, or to control or prevent atonic uterine bleeding after abortion or delivery, to aid in expulsion of the placenta, and during the puerperium. For the latter purpose, the PGE compound is administered by intravenous infusion immediately after abortion or delivery at a dose in the range about 0.01 to about 50 $\mu$g. per kg. of body weight per minute until the desired effect is obtained. Subsequent doses are given by intravenous, subcutaneous, or intramuscular injection or infusion during puerperium in the range 0.01 to 2 mg. per kg. of body weight per day, the exact dose depending on the age, weight, and condition of the patient or animal.

PGE compounds are useful as hypotensive agents to reduce blood pressure in mammals, including man. For this purpose, the compounds are administered by intravenous infusion at the rate about 0.01 to about 50 $\mu$g. per kg. of body weight per minute, or in single or multiple doses of about 25 to 500 $\mu$g. per kg. of body weight total per day.

PGE compounds are useful in place of oxytocin to induce labor in pregnant female animals, including man, cows, sheep, and pigs, at or near term, or in pregnant animals with intrauterine death of the fetus from about 20 weeks to term. For this purpose, the compound is infused intravenously at a dose 0.01 to 50 $\mu$g. per kg. of body weight per minute until or near the termination of the second stage of labor, i.e., expulsion of the fetus. These compounds are especially useful when the femal is one or more weeks post-mature and natural labor has not started, or 12 to 60 hours after the membranes have ruptured and natural labor has not yet started.

PGE compounds are useful for controlling the reproductive cycle in ovulating female mammals, including humans and animals such as monkeys, rats, rabbits, dogs, cattle, and the like. For that purpose, $PGE_1$ for example, is administered systemically, e.g., intravenously, subcutaneously, and intravaginally, at a dose level in the range 0.001 mg. to about 200 mg. per kg. of body weight of the female mammal, advantageously during a span of time starting approximately at the time of ovulation and ending approximately at the next expected time of menses or just prior to that time. Additionally, expulsion of an embryo or fetus is accomplished by similar administration of the compound during the first third of the normal mammalian gestation period.

PGE compounds are useful in female mammals, including humans and useful domestic animals, e.g., dogs and cattle, to produce cervical dilation. This has practical applications in labor induction and abortion where the cervix must be dilated. PGE compounds are also useful in dilation and curettage (D & C) to soften the cervix so that it need not be streched entirely by mechanical means.

As mentioned above, PGE compounds are potent antagonists of epinephrine-induced mobilization of free fatty acids. For this reason, these compounds are useful in experimental medicine for both in vitro and in vivo studies in mammals, including man, rabbits, and rats, intended to lead to the understanding, prevention, symptom alleviation, and cure of diseases involving abnormal lipid mobilization and high free fatty acid levels, e.g., diabetes mellitus, vascular diseases, and hyperthyroidism.

The novel 15-methyl and 15-ethyl prostaglandin analogs encompassed by formula V each cause the same biological responses described above for the corresponding known prostaglandins. Each of these 15-methyl and 15-ethyl compound is accordingly useful for the above-described pharmacological purposes, and is used for those purposes as described above. However, each of these 15-methyl and 15-ethyl prostaglandin analogs is surprisingly and unexpectedly more useful than the corresponding known prostaglandin for at least one of the pharmacological purposes described above because for that purpose the analog is more potent and has a substantially longer duration of activity. For that reason, fewer and smaller doses of these prostaglandin analogs are needed to attain the desired pharmacological results.

The novel PGE-type analogs encompassed by formula V are used as described above in the free acid form, in alkyl ester form, or in pharmacologically acceptable salt form. When the ester form is used, any alkyl ester can be used wherein the alkyl moiety contains one to 8 carbon atoms, inclusive, i.e., methyl, ethyl, propyl, butyl, pentyl, hexyl, heptyl, octyl, and isomeric forms thereof. However, it is preferred that the ester be alkyl of one to four carbon atoms, inclusive. Of those alkyl, methyl and ethyl are especially preferred for optimum absorption of the compound by the body or experimental animal system.

Pharmacologically acceptable salts of these prostaglandin analogs useful for the purposes described above are those with pharmacologically acceptable metal cations, ammonium, amine cations, or quaternary ammonium cations.

Especially preferred metal cations are those derived from the alkali metals, e.g., lithium, sodium and potassium, and from the alkaline earth metals, e.g., magnesium and calcium, although cationic forms of other metals, e.g., aluminum, zinc, and iron, are within the scope of this invention.

Pharmacologically acceptable amine cations are those derived from primary, secondary, or tertiary amines. Examples of suitable amines are methylamine, dimethylamine, trimethylamine, ethylamine, dibutylamine, triisopropylamine, N-methylhexylamine, decylamine, dodecylamine, allylamine, crotylamine, cyclopentylamine, dicyclohexylamine, benzylamine, dibenzylamine, α-phenylethylamine, β-phenylethylamine, ethylenediamine, diethylenetriamine, and like aliphatic, cycloaliphatic, and araliphatic amines containing up to and including about 18 carbon atoms, as well as heterocyclic amines, e.g., piperidine, morpholine, pyrrolidine, piperazine, and lower-alkyl derivatives thereof, e.g., 1-methylpiperidine, 4-ethylmorpholine, 1-isopropylpyrrolidine, 2-methylpyrrolidine, 1,4-dimethylpiperazine, 2-methylpiperidine, and the like, as well as amines containing water-solubilizing or hydrophilic groups, e.g., mono-, di-, and triethanolamine, ethyldiethanolamine, N-butylethanolamine, 2-amino-1-butanol, 2-amino-2-ethyl-1,3-propanediol, 2-amino-2-methyl-1-propanol, tris(hydroxymethyl)aminomethane, N-phenylethanolamine, N-(p-tert-amylphenyl)diethanolamine, galactamine, N-methylglucamine, N-methylglucosamine, ephedrine, phenylephrine, epinephrine, procaine, and the like.

Examples of suitable pharmacologically acceptable quaternary ammonium cations are tetramethylammonium, tetraethylammonium, benzyltrimethylammonium, phenyltriethylammonium, and the like.

As discussed above, the prostaglandin analogs are administered in various ways for various purposes; e.g., intravenously, intramuscularly, subcutaneously, orally, intravaginally, rectally, buccally, sublingually, topically, and in the form of sterile implants for prolonged action.

For intravenous injection or infusion, sterile aqueous isotonic solutions are preferred. For that purpose, it is preferred because of increased water solubility to use the free acid form or the pharmacologically acceptable salt form. For subcutaneous or intramuscular injection, sterile solutions or suspensions of the acid, salt, or ester form in aqueous or non-aqueous media are used. Tablets, capsules, and liquid preparations such as syrups, elixirs, and simple solutions, with the usual pharmaceutical carriers are used for oral or sublingual administration. For rectal or vaginal administration, suppositories, tampons, ring devices, and preparations adapted to generate sprays or foams or to be used for lavage, all prepared as known in the art, are used. For tissue implants, a sterile tablet or silicone rubber capsule or other object containing or or 2 fluoro, chloro, or alkyl of one to 4 carbon atoms, in-

CHART A

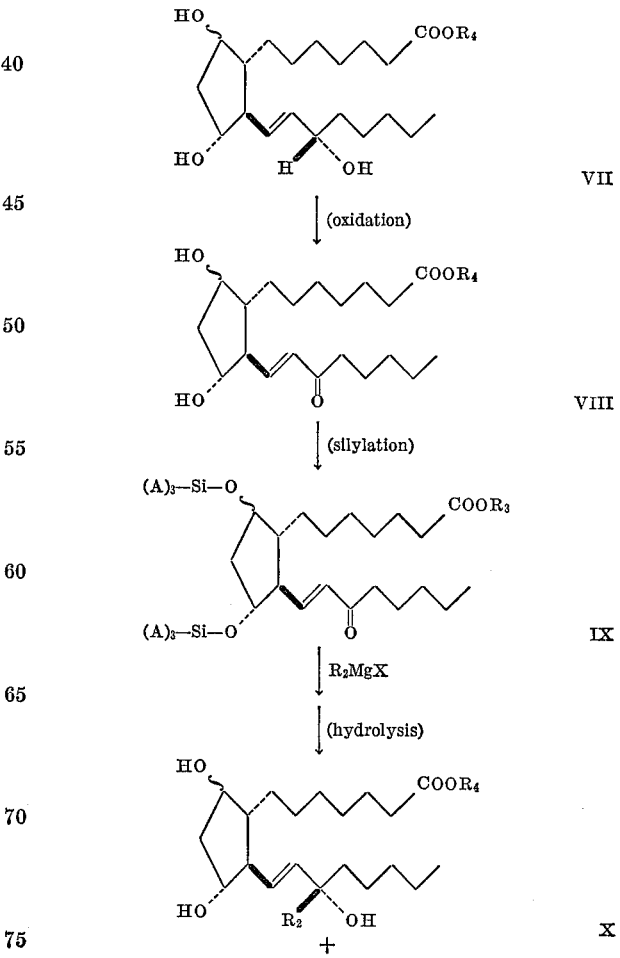

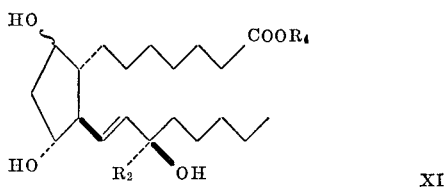

The PGF$_{1\alpha}$-type and PGF$_{1\beta}$-type acids and esters used as starting materials (Chart B) are prepared by the sequence of transformations shown in Chart A, wherein formulas VII, VIII, IX, X, and XI include optically active compounds as shown and racemic compounds of those formulas and the mirror image thereof. Also in Chart A, R$_2$ is methyl or ethyl, R$_4$ is hydrogen or alkyl of one to 8 carbon atoms, inclusive, and ∼ indicates attachment of hydroxy to the ring in alpha or beta configuration. Also in Chart A, A is alkyl of one to 4 carbon atoms, inclusive, aralkyl of 7 to 12 carbon atoms, inclusive, phenyl, or phenyl substituted with one or 2 fluoro, chloro, or alkyl of one to 4 carbon atoms, inclusive, and R$_3$ is alkyl of one to 8 carbon atoms, inclusive, or —Si—(A)$_3$ wherein A is as defined above. The various A's of a —Si(A)$_3$ moiety are alike or different. For example, an —Si(A)$_3$ can be trimethylsilyl, dimethylphenylsilyl, or methylphenylbenzylsilyl. Examples of alkyl of one to 4 carbon atoms, inclusive, are methyl, ethyl, propyl, isopropyl, butyl, isobutyl, sec-butyl, and tert-butyl. Examples of aralkyl of 7 to 12 carbon atoms, inclusive, are benzyl, phenethyl, α-phenylethyl, 3-phenylpropyl, α-naphthylmethyl, and 2-(β-naphthyl)ethyl. Examples of phenyl substituted with one or 2 fluoro, chloro, or alkyl of one to 4 carbon atoms, inclusive, are p-chlorophenyl, m-fluorophenyl, o-tolyl, 2,4-dichlorophenyl, p-tert-butylphenyl, 4-chloro-2-methylphenyl, and 2,4-dichloro-3-methylphenyl.

In Chart A, the final novel PGF$_{1\alpha}$ and PGF$_{1\beta}$ acid and ester analogs useful as intermediates in this invention are encompassed by formula XI.

The initial optically active reactants of formula VII in Chart A, i.e., PGF$_{1\alpha}$ and PGF$_{1\beta}$, and their alkyl esters are known in the art or are prepared by methods known in the art. See, for example, Bergstrom et al., cited above, and U.S. Pat. No. 3,069,322. The initial racemic reactants of formula VII in Chart A, i.e., racemic PGF$_{1\alpha}$, racemic PGF$_{1\beta}$, and alkyl esters of those are also known in the art or are prepared by methods known in the art. See, for example, Just et al., J. Am. Chem. Soc. 91, 5364 (1969) and Corey et al., J. Am. Chem. Soc. 90, 3245 (1968).

The known acids and esters of formula VII are transformed to the corresponding intermediate 15-oxo acids and esters of formula VIII by oxidation with reagents such as 2,3-dichloro-5,6-dicyano-1,4-benzoquinone, activated manganese dioxide, or nickel peroxide (see Fieser et al., "Reagents for Organic Synthesis," John Wiley & Sons, Inc., New York, N.Y., pp. 215, 637 and 731). These reagents are used according to procedures known in the art.

Referring again to Chart A, the intermediate compounds of formula VIII are transformed to silyl derivatives of formula IX, respectively, by procedures known in the art. See, for example, Pierce, "Silylation of Organic Compounds," Pierce Chemical Co., Rockford, Ill. (1968). Both hydroxy groups of the formula VIII reactants are thereby transformed to —O—Si—(A)$_3$ moieties wherein A is as defined above, and sufficient of the silylating agent is used for that purpose according to known procedures. When R$_4$ in the formula VIII intermediate is hydrogen, the —COOH moiety thereby defined is simultaneously transformed to —COO—Si—(A)$_3$, additional silylating agent being used for this purpose. This later transformation is aided by excess silylating agent and prolonged treatment. When R$_4$ in formula VIII is alkyl, then R$_3$ in formula IX will also be alkyl. The necessary silylating agents for these transformations are known in the art or are prepared by methods known in the art. See, for example, Post; "Silicones and Other Organic Silicon Compounds," Reinhold Publishing Corp., New York, N.Y. (1949).

Referring again to Chart A, the intermediate silyl compounds of formula IX are transformed to the final compounds of formulas X+XI by first reacting the silyl compound with a Grignard reagent of the formula R$_2$MgX wherein R$_2$ is methyl or ethyl, and X is chloro, bromo, or iodo. For this purpose, it is preferred that X be bromo. This reaction is carried out by the usual procedure for Grignard reactions, using diethyl ether as a reaction solvent and saturated aqueous ammonium chloride solution to hydrolyze the Grignard complex. The resulting disilyl or trisilyl tertiary alcohol is then hydrolyzed with water to remove the silyl groups. For this purpose, it is advantageous to use a mixture of water and sufficient of a water-miscible solvent, e.g., ethanol, to give a homogenous reaction mixture. The hydrolysis is usually complete in 2 to 6 hours at 25° C., and is preferably carried out in an atmosphere of an inert gas, e.g., nitrogen or argon.

The mixture of 15-S and 15-R isomers obtained by this Grignard reaction and hydrolysis is separated by procedures known in the art for separating mixtures of prostanoic acid derivatives, for example, by chromatography on neutral silica gel. In some instances, the lower alkyl esters, especially the methyl esters of a pair of 15-S and 15-R isomers are more readily separated by silica gel chromatography than are the corresponding acids. In those cases, it is advantageous to esterify the mixture of acids as described below, separate the two esters, and then, if desired, saponify the esters by procedures known in the art for saponification of prostaglandins F.

The novel optically active PGE$_1$-type acids and esters of formula V are prepared by oxidation of the corresponding R PGF$_{1\alpha}$-type or PGF$_{1\beta}$-type acids and alkyl esters of formula XI. For this purpose, an oxidizing agent is used which selectively oxidizes secondary hydroxy groups to carbonyl groups in the presence of carbon-carbon double bonds. These transformations are shown in Chart B wherein formulas XI and XII include optically active compounds as shown and racemic compounds of those formulas and the mirror images thereof. Also in Chart B, R$_2$ is methyl or ethyl, R$_4$ is hydrogen or alkyl of one to 8 carbon atoms, inclusive, and ∼ indicates attachment of hydroxy to the ring in alpha or beta configuration. The reactants and products of formulas XI and XII each have the 15-hydroxy in R configuration.

CHART B

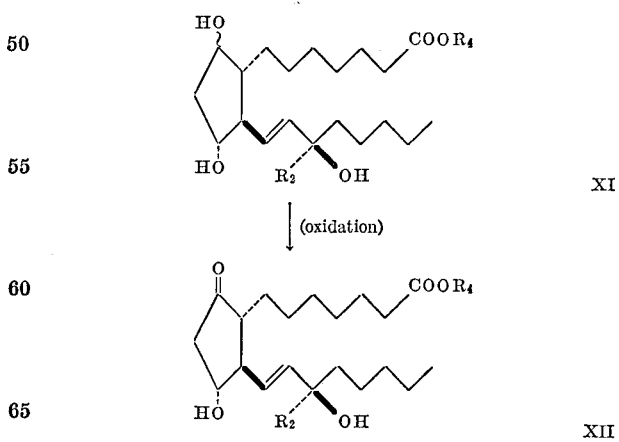

For the transformation of Chart B, the beta isomers of reactants XI are preferred starting materials, although the corresponding alpha isomers are also useful for this purpose.

Oxidation reagents useful for the transformations set forth in Chart B are known to the art. An especially useful reagent for this purpose is the Jones reagent, i.e., acidified chromic acid. See J. Chem. Soc. 39 (1946). Acetone is a suitable diluent for this purpose, and a slight excess beyond the amount necessary to oxidize one of the secondary hydroxy groups of the formula XI reactant is used. Reaction temperatures at least as low as about 0° C. should be used. Preferred reaction temperatures are in the range —10° to —50° C. The oxidation proceeds rapidly and is usually complete in about 5 to about 20 minutes. The excess oxidant is destroyed, for example, by addition of a lower alkanol, advantageously, isopropyl alcohol, and the formula XII PGE-type product is isolated by conventional methods.

Examples of other oxidation reagents useful for the Chart B transformations are silver carbonate on Celite (Chem. Commun. 1102 (1969)), mixtures of chromium trioxide and pyridine (Tetrahedron Letters 3363 (1968), J. Am. Chem. Soc. 75, 422 (1953), and Tetrahedron, 18, 1351 (1962)), mixtures of sulfur trioxides in pyridine and dimethyl sulfoxide (J. Am. Chem. Soc. 89, 5505 (1967)), and mixtures of dicyclohexylcarbodiimide and dimethyl sulfoxide (J. Am. Chem. Soc. 87, 5661 (1965)).

Still another process for transforming the PGF-type compounds XI to PGE-type compounds XII is shown in Chart C, wherein formulas XI, XII, XIII, and XIV include optically active compounds as shown and racemic compounds of those formulas and the mirror image thereof. In Chart C, A has the same definition as in Chart A above. Also in Chart C, $R_2$ is methyl or ethyl, $R_4$ is hydrogen or alkyl of one to 8 carbon atoms, inclusive, $R_5$ is hydrogen, alkyl of one to 8 carbon atoms, inclusive, or —Si—$(A)_3$ wherein A is as defined above.

CHART C

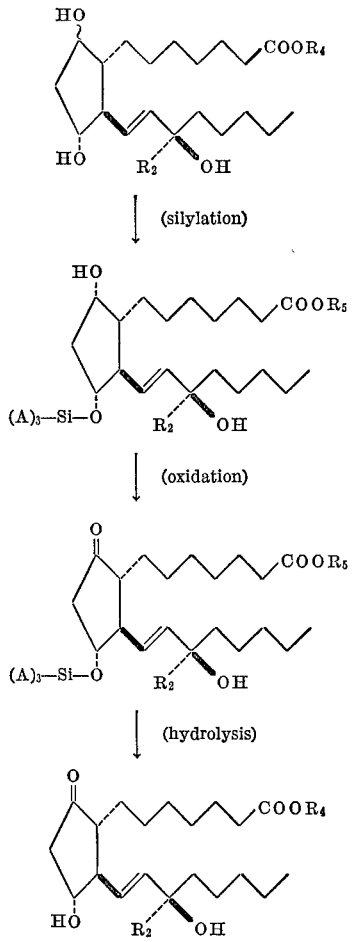

Consider, first, step 1 of Chart C, wherein the formula XI compounds are selectively silylated at the C-11 position. Silylating agents of the type $(A)_3SiN(E)_2$, i.e. substituted silylamines wherein A is as defined above and E has the same definition as A, being the same or different, are useful for the above purpose at temperatures below about —25° C. A preferred temperature range is about —35° to —50°. At higher temperatures some silylation of C-9 hydroxyl groups as well as the C-11 hydroxyl groups occurs, whereas at lower temperatures the rate of silylation is undesirably slow. Examples of the silylamine type silylating agents suitable for forming the formula XIII intermediates include pentamethylsilylamine, pentaethylsilylamine, N-trimethylsilyldiethylamine, 1,1,1-triethyl-N,N-dimethylsilylamine, N,N-diisopropyl-1,1,1-trimethylsilylamine, 1,1,1-tributyl-N,N-dimethylsilylamine, N,N-dibutyl-1,1,1-trimethylsilylamine, 1-isobutyl-N,N,1,1-tetramethylsilylamine, N-benzyl-N-ethyl-1,1,1-trimethylsilylamine, N,N,1,1-tetramethyl-1-phenylsilylamine, N,N-diethyl-1,1-dimethyl-1-phenylsilylamine, N,N-diethyl-1-methyl-1,1-diphenylsilylamine, N,N-dibutyl-1,1,1-triphenylsilylamine, and 1-methyl-N,N,1,1-tetraphenylsilylamine.

The reaction is carried out with exclusion of atmospheric moisture, for example under a nitrogen atmosphere. It is conveniently done in a solvent such as acetone or dichloromethane, although the silylating agent itself, when used in excess, may also serve as a liquid medium for the reaction. The reaction ordinarily is completed in a few hours, and should be terminated when the C-11 hydroxyl groups are silylated to avoid side reactions. The progress of the reaction is conveniently monitored by thin-layer chromatography (TLC), utilizing methods known in the art.

Trisubstituted mono-chlorosilanes such as chlorotriphenylsilane will also yield formula XIII 11-substituted intermediates under suitable conditions of temperature and time of reaction. For the above purpose, these reagents are used in the presence of a tertiary base such as pyridine at temperatures of or below 25° C., preferably in the range of about 0° to +25° C. Examples of the trisubstituted monochlorosilanes suitable for this purpose include chlorotriethylsilane, chlorotriisobutylsilane, chlorotriphenylsilane, chlorotris(p-chlorophenyl)silane, chlorotri-m-tolylsilane, and tribenzylchlorosilane. As in using the silylamines above, the progress of the reaction is monitored by TLC and the conditions for optimized 11-silylation are determined by experimentation.

For either of the above types of silylating agents, an excess of the reagent over that stoichiometrically required is used, preferably at least a four-fold excess. When $R_4$ in the formula XI starting material is hydrogen the —COOH moiety thereby defined may be partially or even completely transformed to —COO—Si—$(A)_3$, additional silylating agent being used for this purpose. Whether or not this occurs is immaterial, since —COOH groups are not changed by the subsequent steps and $$-COO-Si-(A)_3$$

groups are easily hydrolyzed to —COOH groups.

Consider, next, step 2 of Chart C, wherein the formula XIII 11-silylated intermediate is oxidized to compound XIV. Oxidation reagents useful for this transformation are known to the art. An especially useful reagent for this purpose is the Collins reagent, i.e. chromium trioxide in pyridine. See J. C. Collins et al., Tetrahedron Lett., 3363 (1968). Dichloromethane is a suitable diluent for this purpose. A slight excess of the oxidant beyond the amount necessary to oxidize the C-9 secondary hydroxy group of the formula XIII intermediate is used. Reaction temperatures of below 20° C. should be used. Preferred reaction temperatures are in the range —10° to +10° C. The oxidation proceeds rapidly and is usually complete in about 5 to 20 minutes. The formula XIV 15-alkyl PGE-type intermediate is isolated by conventional methods.

Examples of other oxidation reagents useful for this transformation are those named above in connection with Chart B, including silver carbonate on Celite and also t-butylchromate in pyridine (Biochem. J., 84, 195 (1962)).

Finally in step 3 of Chart C, all silyl groups of the formula XIV intermediates are removed by hydrolysis, thereby forming the formula XII PGE-type products. These hydrolyses are carried out by prior art procedures known to be useful for transforming silyl ethers and silyl esters to alcohols and carboxylic acids, respectively. See, for example, Pierce cited above, especially p. 447 thereof. A mixture of water and sufficient of a water-miscible organic diluent to give a homogeneous hydrolysis reaction mixture represents a suitable reaction medium. Addition of a catalytic amount of an organic or inorganic acid hastens the hydrolysis. The length of time required for the hydrolysis is determined in part by the hydrolysis temperature. With a mixture of water and methanol at 25° C., several hours is usually sufficient for hydrolysis. At 0° C., several days is usually necessary.

As discussed above, the processes of Charts A, B, and C lead either to acids ($R_4$ is hydrogen) or to alkyl esters ($R_4$ is alkyl of one to 8 carbon atoms, inclusive). When a formula XII $PGE_1$-type acid has been prepared and an alkyl ester is desired, esterification is advantageously accomplished by interaction of the acid with the appropriate diazohydrocarbon. For example, when diazomethane is used, the methyl esters are produced. Similar use of diazoethane, diazobutane, and 1-diazo-2-ethylhexane, for example, gives the ethyl, butyl, and 2-ethylhexyl esters, respectively.

Esterification with diazohydrocarbons is carried out by mixing a solution of the diazohydrocarbon in a suitable inert solvent, preferably diethyl ether, with the acid reactant, advantageously in the same or a different inert diluent. After the esterification reaction is complete, the solvent is removed by evaporation, and the ester purified if desired by conventional methods, preferably by chromatography. It is preferred that contact of the acid reactants with the diazohydrocarbon be no longer than necessary to effect the desired esterification, preferably about one to about ten minutes, to avoid undesired molecular changes. Diazohydrocarbons are known in the art or can be prepared by methods known in the art. See, for example, Organic Reactions, John Wiley & Sons, Inc., New York, N.Y., Vol. 8, pp. 389–394 (1954).

An alternative method for esterification of the carboxyl moiety of the PGE-type compounds comprises transformation of the free acid to the corresponding silver salts, followed by interaction of that salt with an alkyl iodide. Examples of suitable iodides are methyl iodide, ethyl iodide, butyl iodide, isobutyl iodide, tert-butyl iodide, and the like. The silver salts are prepared by conventional methods for example, by dissolving the acid in cold dilute aqueous ammonia, evaporating the excess ammonia at reduced pressure, and then adding the stoichiometric amount of silver nitrate.

The novel formula XII acids ($R_1$ is hydrogen) are transformed to pharmacologically acceptable salts by neutralization with appropriate amounts of the corresponding inorganic or organic base, examples of which correspond to the cations and amines listed above. These transformations are carried out by a variety of procedures known in the art to be generally useful for the preparation of inorganic, i.e., metal or ammonium, salts, amine acid addition salts, and quaternary ammonium salts. The choice of procedure depends in part upon the solubility characteristics of the particular salt to be prepared. In the case of the inorganic salts, it is usually suitable to dissolve the acid in water containing the stoichiometric amount of a hydroxide, carbonate, or bicarbonate corresponding to the inorganic salt desired. For example, such use of sodium hydroxide, sodium carbonate, or sodium bicarbonate gives a solution of the sodium salt of the prostanoic acid derivative. Evaporation of the water or addition of a water-miscible solvent of moderate polarity, for example, a lower alkanol or a lower alkanone, gives the solid inorganic salt if that form is desired.

To produce an amine salt, the acid is dissolved in a suitable solvent of either moderate or low polarity. Examples of the former are ethanol, acetone, and ethyl acetate. Examples of the latter are diethyl ether and benzene. At least a stoichiometric amount of the amine corresponding to the desired cation is then added to that solution. If the resulting salt does not precipitate, it is usually obtained in solid form by addition of a miscible diluent of low polarity or by evaporation. If the amine is relatively volatile, any excess can easily be removed by evaporation. It is preferred to use stoichiometric amounts of the less volatile amines.

Salts wherein the cation is quaternary ammonium are produced by mixing the acid with the stoichiometric amount of the corresponding quaternary ammonium hydroxide in water solution, followed by evaporation of the water.

The invention can be more fully understood by the following examples.

Infrared adsorption spectra are recorded on a Perkin-Elmer model 421 infrared spectrophotometer. Undiluted (neat) samples of the liquids and oils are used. Mineral oil (Nujol) mulls of the solids are used.

NMR spectra are recorded on a Varian A–60 spectrophotometer with tetramethylsilane as an internal standard (downfield) and using solvents as indicated below.

Mass spectra are recorded on an Atlas CH–4 mass spectrometer with a TO–4 source (ionization voltage 70 ev.).

The term "15-oxo-" in front of a compound name, e.g., 15-oxo-$PGF_{1\alpha}$, refers to a prostaglandin analog wherein the moiety

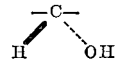

at the 15 position has been transformed to

Example 1.—15-Oxo-$PGF_{1\alpha}$ 2,3 - Dichloro - 5,6 - dicyano-1,4-benzoquinone (463 mg.) is added to a soltuion of $PGF_{1\alpha}$ (600 mg.) in 30 ml. of dioxane. The mixture is stirred 24 hours at 50° C. under nitrogen, and then is cooled to 20° C. and filtered. The filtered solids are washed with dichloromethane. Evaporation of the combined filtrate and washings at reduced pressure gives 650 mg. of a residue which is chromatographed on 150 g. of silica gel (Silicar CC–4; Mallinckrodt), eluting with 50% ethyl acetate in Skellysolve B (a mixture of isomeric hexanes). Evaporation of the eluates gives 545 mg. of 15-oxo-$PGF_{1\alpha}$; infrared absorption at 3400, 2660, 1700, 1660, 1620, 1460, 1410, 1375, 1285, 1250, 1185, 1120, 1070, and 980 cm.$^{-1}$.

Example 2.—15-Oxo-$PGF_{1\beta}$ 2,3-Dichloro-5,6-dicyano-1,4-benzoquinone (1.0 g.) is added to a solution of $PGF_{1\beta}$ (1.3 g.) in 80 ml. of dioxane. The mixture is stirred 24 hours at 50° C. under nitrogen, and is then cooled to 20° C. and filtered. The filtered solids are washed with dichloromethane. Evaporation of the combined filtrate and washings at reduced pressure gives 1.6 g. of a residue which is chromatographed on 400 g. of silica gel (Silicar CC–4; Mallinckrodt), eluting with 75% ethyl acetate in Skellysolve B. Evaporation of the eluates gives 1.15 g. of 15-oxo-$PGF_{1\beta}$; infrared absorption at 3380, 2660, 1720, 1705, 1665, 1620, 1460, 1405, 1370, 1325, 1285, 1235, 1190, 1080, 1040, and 980 cm.$^{-1}$.

Following the procedure of Example 1, the methyl, ethyl, tert-butyl, and 2-ethylhexyl esters of $PGF_{1\alpha}$ and $PGF_{1\beta}$ are each oxidized to the corresponding 15-oxo-compounds.

Also following the procedure of Example 1, the racemic forms of $PGF_{1\alpha}$ and $PGF_{1\beta}$, and the methyl, ethyl, tert-butyl, and 2-ethylhexyl esters of each of those are each oxidized to the corresponding racemic 15-oxo compound.

Example 3.—Tris-(trimethylsilyl) Derivatives of 15-Oxo-PGF$_{1\alpha}$

A mixture of hexamethyldisilazane (11 ml.) and trimethylchlorosilane (2.2 ml.) is added to a solution of 15-oxo-PGF$_{1\alpha}$ (545 mg.) in 55 ml. of tetrahydrofuran. This mixture is stirred 16 hours at 25° C. under nitrogen, and is then filtered. The filtrate is evaporated under reduced pressure. Xylene (50 ml.) is added to the residue and the mixture is evaporated at 60° C. under reduced pressure. This addition of xylene and evaporation is repeated twice. The resulting residue is the tris-(trimethylsilyl) derivative of 15-oxo-PGF$_{1\alpha}$; infrared absorption at 1365, 1250, and 1180 cm.$^{-1}$.

Example 4.—Tris-(trimethylsilyl) Derivatives of 15-Oxo-PGF$_{1\beta}$

Following the procedure of Example 3, 15-oxo-PGF$_{1\beta}$ is transformed to the tris-(trimethylsilyl) derivative; infrared absorpton at 1725, 1680, 1635, 1365, 1250, 1180, 1065, 980, 840, and 750 cm$^{-1}$.

Following the procedure of Example 3, the methyl, ethyl, tert-butyl, and 2-ethylhexyl esters of 15-oxo-PGF$_{1\alpha}$ and 15-oxo-PGF$_{1\beta}$ are each transformed to the corresponding bis-(trimethylsilyl) derivative.

Also following the procedure of Example 3, the racemic forms of 15-oxo-PGF$_{1\alpha}$ and 15-oxo-PGF$_{1\beta}$, and the methyl, ethyl, tert-butyl, and 2-ethylhexyl esters of each of those are each transformed to trimethylsilyl derivatives, the acids to tris derivatives and the esters to bis derivatives.

Example 5.—15-Methyl-15(R)-PGF$_{1\alpha}$

A 3 molar diethyl ether solution of methylmagnesium bromide (0.55 ml.) is added dropwise to a stirred solution of the tris-(trimethylsilyl) derivative of 15-oxo-PGF$_{1\alpha}$ (850 mg.) in 25 ml. of diethyl ether at 25° C. The mixture is stirred 30 minutes at 25° C., after which an additional 0.2 ml. of the methylmagnesium bromide solution is added and stirring is continued an additional 30 minutes. The resulting reaction mixture is poured into 75 ml. of saturated aqueous ammonium chloride solution at 0° C. After stirring several minutes, the mixture is extracted repeatedly with diethyl ether. The combined diethyl ether extracts are washed with saturated aqueous sodium chloride solution and then dried with anhydrous sodium sulfate. Evaporation of the diethyl ether gives a yellow oil (910 mg.) which is dissolved in 45 ml. of ethanol. That solution is diluted with 30 ml. of water, and the mixture is stired 4 hours at 25° C. The ethanol in the resulting solution is evaporated at reduced pressure, and the aqueous residue is saturated with sodium chloride and then extracted with ethyl acetate. The extract is washed with saturated aqueous sodium chloride solution, dried with anhydrous sodium sulfate, and evaporated under reduced pressure to give 640 mg. of a mixture of 15-methyl-PGF$_{1\alpha}$ and 15-methyl-15(R)-PGF$_{1\alpha}$; infrared absorption at 3280, 2600, and 1710 cm.$^{-1}$.

The mixture of 15-methyl-PGF$_{1\alpha}$ and 15-methyl-15(R)-PGF$_{1\alpha}$ is dissolved in 50 ml. of diethyl ether and cooled to 0° C. Excess diazomethane dissolved in diethyl ether is then added, and the mixture is maintained 5 minutes at 0° C. and then 5 minutes at 25° C. The solution is evaporated in a stream of nitrogen, and the residue is chromatographed on 550 g. of neutral silica, eluting with 75% ethyl acetate in Skellysolve B. Evaporation of eluate fractions gives, successively, 127 mg. of 15-methyl-15(R)-PGF$_{1\alpha}$ methyl ester, 150 mg. of a mixture of 15-methyl-15(R)-PGF$_{1\alpha}$ methyl ester and 15-methyl-PGF$_{1\alpha}$ methyl ester, and 228 mg. of 15-methyl-PGF$_{1\alpha}$ methyl ester.

Aqueous potassium hydroxide solution (45%; 0.7 ml.) is added to a solution of 15-methyl-15(R)-PGF$_{1\alpha}$ methyl ester (151 mg.) in a mixture of 4.4 ml. of methanol and 1.5 ml. of water under nitrogen. The resulting solution is stirred 2 hours at 25° C., and is then poured into several volumes of water. The aqueous mixture is extracted with ethyl acetate, acidified with 3 N hydrochloric acid, saturated with sodium chloride, and then extracted repeatedly with ethyl acetate. The latter ethyl acetate extracts are combined, washed successively with water and saturated aqueous sodium chloride solution, dried with anhydrous sodium sulfate, and evaporated under reduced pressure to give 15-methyl-15(R)-PGF$_{1\alpha}$ in the form of an oil; infrared absorption at 3380, 2650, 1710, 1460, 1410, 1375, 1275–1200, 1125, 1075, 1040 and 975 cm.$^{-1}$; NMR peaks (dimethylformamide) at 5.5 and 4.4–3.6 (multiplet) $\delta$; mass spectral molecular ion peaks at 352, 334, 316, and 263.

Following the procedure of Example 5, 15-oxo-PGF$_{1\beta}$ is transformed to 15-methyl-15(R)-PGF$_{1\beta}$.

Also following the procedure of Example 5, the methyl, ethyl, tert-butyl, and 2-ethylhexyl esters of the bis-(trimethylsilyl derivatives) of 15-oxo-PGF$_{1\alpha}$ and 15-oxo-PGF$_{1\beta}$ are each transformed to the corresponding 15-methyl-15(R) esters.

Also following the procedure of Example 5, the racemic forms of the trimethylsilyl derivatives of 15-oxo-PGF$_{1\alpha}$ and 15-oxo-PGF$_{1\beta}$, and the methyl, ethyl, tert-butyl, and 2-ethylhexyl esters of each of those, tris derivatives of the acids and bis derivatives of the esters, are each transformed to the corresponding 15-methyl-15(R) acid or esters.

Also following the procedure of Example 5 but using ethylmagnesium bromide in place of methylmagnesium bromide, the tris-(trimethylsilyl) derivatives of 15-oxo-PGF$_{1\alpha}$ and 15-oxo-PGF$_{1\beta}$, and the racemic form of each of those optically active acids, and also the bis-(trimethylsilyl) derivative of the methyl, ethyl, tert-butyl, and 2-ethyl-hexyl ester of each of those optically active and racemic acids are each transformed to the corresponding 15-ethyl-15(R) acid or ester.

Example 6.—15-Methyl-15(R)-PGE$_1$

A solution of 15-methyl-15(R)-PGF$_{1\alpha}$ (95 mg.) in 40 ml. of acetone is cooled to $-10$° C. Jones reagent (0.1 ml. of a solution of 21 g. of chromic anhydride, 60 ml. of water, and 17 ml. of concentrated sulfuric acid), precooled to 0° C., is added with vigorous stirring. After 5 minutes at $-10$° C., thin layer chromatography on silica gel (acetic acid:methanol:chloroform; 5:5:90) of a small portion of the reaction mixture indicates about 50% reaction completion. An additional 0.06 ml. of Jones reagent is added to the still cold reaction mixture with stirring, and the mixture is stirred an additional 5 minutes at $-10$° C. Isopropyl alcohol (1 ml.) is added to the cold reaction mixture. After 5 minutes, the mixture is filtered through a layer of diatomaceous earth (Celite). The filtrate is evaporated at reduced pressure, and the residue is mixed with 5 ml. of saturated aqueous sodium chloride solution. The mixture is extracted repeatedly with ethyl acetate, and the combined extracts are washed with saturated aqueous sodium chloride solution, dried with anhydrous sodium sulfate, and evaporated at reduced pressure. The residue is chromatographed on 20 g. of neutral silica gel, eluting with 50% ethyl acetate in Skellysolve B. Evaporation of the eluates gives 15-methyl-15(R)-PGE$_1$.

Following the procedure of Example 6, 15 - methyl-15(R)-PGF$_{1\beta}$ is oxidized to 15-methyl-15(R)-PGE$_1$.

Also following the procedure of Example 6, the methyl, ethyl, tert-butyl, and 2-ethylhexyl esters of 15-methyl-15(R)-PGF$_{1\alpha}$ and 15-methyl - 15(R) - PGF$_{1\beta}$ are each oxidized to the corresponding 15-methyl - 15(R) - PGE$_1$ ester.

Also following the procedure of Example 6, the racemic forms of 15 methyl - 15(R) 1 PGF$_{1\alpha}$ and 15 - methyl-15(R)-PGF$_{1\beta}$, and the methyl, ethyl, tert-butyl, and 2-ethylhexyl esters of each of those racemic acids are each oxidized to the corresponding 15-methyl-15(R)-PGE$_1$ acid or ester.

Also following the procedure of Example 6, 15-ethyl-15(R)-PGF$_{1\alpha}$ and 15 - ethyl - 15(R) - PGF$_{1\beta}$, and the racemic forms of each of those optically active acids, and the methyl, ethyl, tert-butyl, and 2-ethylhexyl ester of each of those optically active and racemic acids are each oxidized to the corresponding 15-ethyl-15(R)-PGE$_1$ acid or ester.

Example 7.—15-Methyl-15(R)-PGE$_1$

A. Refer to Chart C. There is first prepared 15-methyl-15(R)-PGF$_{1\alpha}$, 11-trimethylsilyl ether. N-Trimethylsilyldiethylamine (2 ml.) is added slowly to a mixture of 15-methyl - 15(R) - PGF$_{1\alpha}$ (Example 5, 0.5 g.) and 20 ml. of acetone previously cooled to —45° C., and kept under nitrogen. Progress of the reaction is monitored by thin-layer chromatography (TLC). The reaction temperature is maintained at —40° to —45° C. for one hour whereupon the mixture is diluted with 80 ml. of diethyl ether (previously cooled to —78° C.). The solution is washed with 200 ml. of cold saturated sodium bicarbonate solution. The organic phase is washed with brine, dried over sodium sulfate, and concentrated to yield 15 - methyl-15(R)-PGF$_{1\alpha}$, 11-trimethylsilyl ether.

B. A solution of the product of step A (0.6 g.) in 15 ml. of dichloromethane is added to Collins reagent, prepared from chromium trioxide (1.0 g.) and pyridine (1.6 g.) in 50 ml. of dichloromethane and cooled to 0° C. The mixture is stirred for 30 min. at about 25° C., then filtered. The filtrate is concentrated to yield 15-methyl - 15(R)-PGE$_1$, 11-trimethylsilyl ether.

C. A solution of the product of step B (0.5 g.) in 30 ml. of methanol is mixed with 15 ml. of water at about 25° C. and stirred for about 15 min. The mixture is partitioned between diethyl ether and 2 M. sodium hydrogen sulfate. The ether extract is washed with saturated aqueous sodium bicarbonate and brine, dried over sodium sulfate, and concentrated. The residue is chromatographed on silica gel, combining those fractions shown by TLC to contain the product free of starting material and impurities, and concentrating to yield the title compound.

Example 8.—Racemic 15-Methyl-15(R)-PGE$_1$

Following the procedures of Example 7, the racemic form of 15-methyl-15(R)-PGF$_{1\alpha}$ (Example 5) is transformed to the title compound.

I claim:
1. An optically active compound of the formula:

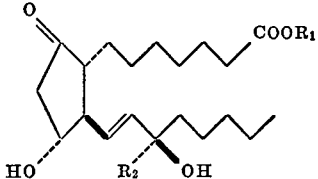

wherein R$_1$ is hydrogen, alkyl of one to 8 carbon atoms, inclusive, or a pharmacologically acceptable cation, and wherein R$_2$ is methyl or ethyl.

2. 15-Methyl - 15(R) - PGE$_1$, an optically active compound according to claim 1 wherein R$_1$ is hydrogen and R$_2$ is methyl.

References Cited
UNITED STATES PATENTS
3,514,383   5/1970   Beal III et al. _____ 209—158

OTHER REFERENCES
Ramwell et al.: Nature *221*, 1251 (1969).
Pike et al.: J. O. C. *34*, 3552 (1969).
Corey et al.: JACS *90*, 3245 (1968).

ROBERT GERSTL, Primary Examiner

U.S. Cl. X.R.
260—211 R, 247.2 R, 268 R, 293.65, 326.3, 429.9, 430, 459 R, 448 R, 448.8 R, 468 D, 501.1, 501.15, 501.17, 501.2; 424—305, 317

UNITED STATES PATENT OFFICE
CERTIFICATE OF CORRECTION

Patent No. 3,849,487     Dated November 19, 1974

Inventor(s) Gordon L. Bundy

It is certified that error appears in the above-identified patent and that said Letters Patent are hereby corrected as shown below:

Column 3, line 25, "berbil" should read -- gerbil --; line 36, "serontonin" should read --serotonin --. Column 4, line 36, "oxytocin" should read -- oxytocic --; line 67 "femal" should read -- female --. Column 6, line 35, " or 2 fluoro, chloro, or alkyl of one to 4 carbon atoms, in-" should read -- impregnated with the substance is used --. Column 12, line 17 "adsorption" should read -- absorption --; line 35 "15position" should read -- 15-position --. Column 13, line 48 "stired" should read -- stirred --. Column 14, line 69 "15(R) 1 PGF$_1\alpha$" should read -- 15(R)-PGF$_{1\alpha}$ --.

Signed and sealed this 1st day of April 1975.

(SEAL)
Attest:

RUTH C. MASON
Attesting Officer

C. MARSHALL DANN
Commissioner of Patents
and Trademarks